United States Patent [19]
Brock et al.

[11] Patent Number: 5,034,838
[45] Date of Patent: Jul. 23, 1991

[54] BI-DIRECTIONAL READ WHILE WRITE MAGNETIC HEAD ASSEMBLY HAVING A WEAR AVOIDANCE CONTOUR

[75] Inventors: George W. Brock, LaJolla; Wlodzimierz S. Czarnecki; Jeremiah F. Connolly, both of San Diego, all of Calif.

[73] Assignee: Eastman Kodak Company, Rochester, N.Y.

[21] Appl. No.: 520,433

[22] Filed: May 8, 1990

[51] Int. Cl.[5] .............................................. G11B 5/187
[52] U.S. Cl. ..................................... 360/122; 360/121
[58] Field of Search ........................ 360/122, 121, 125

[56] References Cited

U.S. PATENT DOCUMENTS

| | | | |
|---|---|---|---|
| 4,639,808 | 1/1987 | Thornley | 360/121 |
| 4,809,110 | 2/1989 | Hertrich | 360/122 |
| 4,853,814 | 8/1989 | McClure | 360/122 |
| 4,875,129 | 10/1989 | Favrou et al. | 360/122 |
| 4,888,657 | 12/1989 | Lacey et al. | 360/122 |

FOREIGN PATENT DOCUMENTS

| | | | |
|---|---|---|---|
| 58-97121 | 6/1983 | Japan | 360/122 |
| 1-263907 | 10/1989 | Japan | 360/122 |

OTHER PUBLICATIONS

IBM/TDB vol. 14, No. 9, Feb. 1972, pp. 2631-2632 "Bidirectional Magnetic Head" by Chow et al.

*Primary Examiner*—John H. Wolff
*Attorney, Agent, or Firm*—Dennis P. Monteith

[57] ABSTRACT

A bi-directional magnetic head assembly comprises a first write head adjacent to a read head, adjacent to a second write head. The three heads are in-line, so that the tape engages one or the other write head followed by the read head for either direction of tape motion. The central read head has slots on either side of its transducing region for skiving of entrained air and debris from the tape before the tape engages the transducing element of the read head for either direction of tape travel. On the other hand, each write head has only a single slot for skiving entrained air and debris; a slot being located in each write head structure outboard from the write transducing gap. In reading while writing during bi-directional operation, the write head first approached by the tape for a given direction of motion is the active, writing head. Because the slot is on the outboard side of each write head structure, skiving action occurs prior to the tape reaching the active write transducing gap. However, after the tape successively passes over the writing head and read head, it approaches the second, presently inactive write head from the inboard side of the second write head structure. The approach to the head gap from this direction is over a gently curved, unslotted portion of the second write head. Attendantly, there is minimal skiving action, and entrained air causes the tape to fly without substantially contacting the inactive write structure.

3 Claims, 2 Drawing Sheets

BI-DIRECTIONAL READ WHILE WRITE MAGNETIC HEAD ASSEMBLY HAVING A WEAR AVOIDANCE CONTOUR

BACKGROUND OF THE INVENTION

1. Field of the Invention

This invention relates to a magnetic record/reproduce head assembly, and in particular to a head assembly having a bi-directional read while write capability.

2. Description Relative to the Prior Art

In a magnetic tape recorder, a read while write capability is an essential feature for providing error free magnetically stored data. A read while write head assembly comprises a record head in-line with a contiguous read head; the gap of the read head being closely spaced to the gap of the record head, with the read head positioned downstream of the record head in the direction of tape motion. By continually reading "just recorded" data while writing, the quality of the recorded data is immediately determinable at a time while the original data is still available in temporary storage in the recording system. The reproduced data is checked against the original data, and appropriate action, such as re-recording, taken in case of error.

Many modern tape systems require operation where writing and reading of the data occurs for either direction of tape travel. The streaming tape system where the recording is laid down on the tape in a serpentine pattern for alternate directions of tape travel is an example of such a bi-directional recording system. Incorporation of read while writing capability for bi-directional operation necessitates a head assembly consisting of a first write head adjacent to a read head which is adjacent to a second write head, or a first read head adjacent to a write head which is adjacent to a second read head. The choice between these head assembly configurations depends upon specific overall system design considerations.

Concurrent with bi-directional operation, the present trend in magnetic recording calls for higher data transfer rates and higher data packing density on the tape. Higher packing density is synonymous with shorter recorded wavelength and, as is known in the art, signal spacing loss during both record and reproduce operations becomes increasingly severe with decreasing recorded wavelength. Intimate contact between the tape and the head is therefore required to preclude signal deterioration due to the spacing loss. The tendency of the tape to fly over the head caused by entrained air acting as a bearing, and the presence of debris at the interface between the tape and head which lifts the tape away from the head gap are primary causes of tape-to-head spacing.

A variety of solutions have been advanced in the prior art for attacking the spacing loss problem. Shaping the head contour to effect improvement has been disclosed in U.S. Pat. No. 4,853,814 issued in the name of McClure, where the head has a radius of curvature equal to the natural bending radius of the tape to provide a constant wear characteristic, and has steep shoulders for skiving the tape surface in order to remove entrained air and debris adhering to the tape. In U.S. Pat. No. 4,875,129 issued in the names of Favrou et al, a constant wear profile head assembly is disclosed having slots in the head structure to perform the skiving of the tape surface.

In order to ensure optimum contact between the magnetic tape and the head at the transducing gap, it is necessary to provide a tape path whose geometry is such that tension applied to the tape has a component that forces the tape surface against the contour of the head at the gap line. Tape being abrasive and head materials being refractory, this force component causes undesired mutual abrasion of the tape and head as well as the desired skiving of the air bearing and debris at the steep shoulders or slots of a head. Head wear at the gap is particularly undesirable as the head becomes inoperable if it is worn through at the gap. Thus, in the prior art, the combination of skiving surfaces at the head and tension in the tape has detrimental abrasive side effects that must be accepted in guaranteeing intimate tape head contact for both uni-directional and bi-directional recording and playback operations.

SUMMARY OF THE INVENTION

A bi-directional magnetic head assembly comprises a first write head adjacent to a read head, which in turn, is adjacent to a second write head. The three heads are in-line along the tape path, so that the tape engages one or the other write head followed by the read head for either direction of tape motion. The centrally positioned read head is provided with slots on either side of its transducing section for skiving of entrained air and debris from the tape before the tape engages the transducing element of the read head for either direction of bi-directional tape travel. On the other hand, each write head is provided with only a single slot for skiving entrained air and debris; a slot being located in each write head structure outboard from the write transducing gap.

In reading while writing during bi-directional operation, the write head first approached by the tape for a given direction of motion is the active, writing head. Because the slot is on the outboard side of each write head structure, skiving action occurs prior to the tape reaching the active write transducing gap. However, after the tape successively passes over the writing head and read head, it approaches the second, presently inactive write head from the inboard side of the second write head structure. The approach to the head gap from this direction is over a gently curved, unslotted portion of the second write head. Attendantly, there is minimal skiving action, and entrained air causes the tape to fly without substantially contacting the inactive write structure. In bi-directional operation, therefore, the tape substantially flies over one or the other of the write heads, ameliorating abrasive wear of the tape as well as of the write head assemblies.

DESCRIPTION OF THE INVENTION

The invention will be described with respect to the drawings of which:

Figure 1:
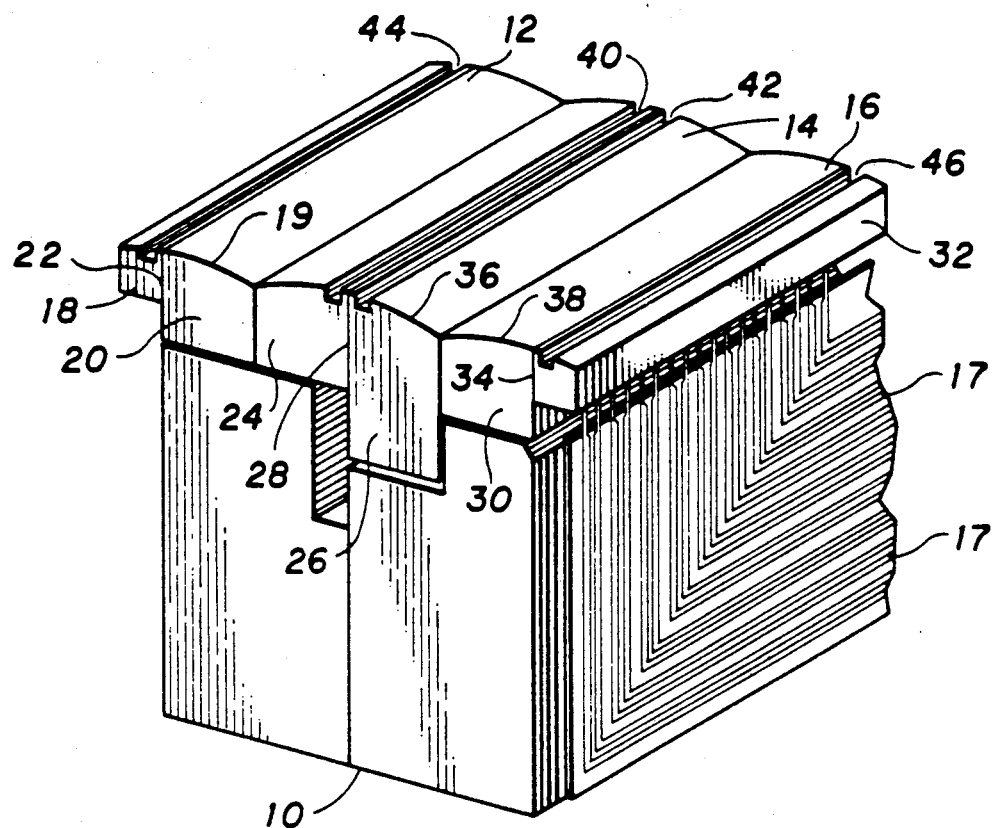
FIG. 1 is a triametric drawing of a bi-directional read while write head assembly in accordance with the invention.

Referring to FIG. 1, a multitrack read while write head assembly 10 for bi-directional operation comprises an inductive write head 12, a magnetoresistive (MR) read head 14, and a second inductive write head 16. The write head 12 is further comprised of two abutting half segments 18,20 made of a refractory, non-magnetic material such as a titanium-carbide-aluminum oxide, of which, AC-2 manufactured by the Sumitomo Company, Japan is an example. The gap line 22 of the head 12 lies along the line of abutment of the half segments 18,20, and the assembled two half sections 18,20 are provided with an overall radiused contour 19, typically having a radius value of 0.375". The adjacent MR read head 14 is also comprised of two AC-2 half sections 24,26 and the MR elements of the read head 14 are located in the gap line 28 along the abutment of the sections 24,26. Adjacent to the read head 14 is the second write head 16 of AC-2 comprising two half sections 30,32 and having an abutment gap line 34, which is the mirror image of the head 12. The read head 14 and the second write head 16 also have radiused contours 36,38 having radii values of 0.375". Also seen in the view of FIG. 1, are the connections 17 to the multitrack writing elements of the write head 16.

Figure 2:
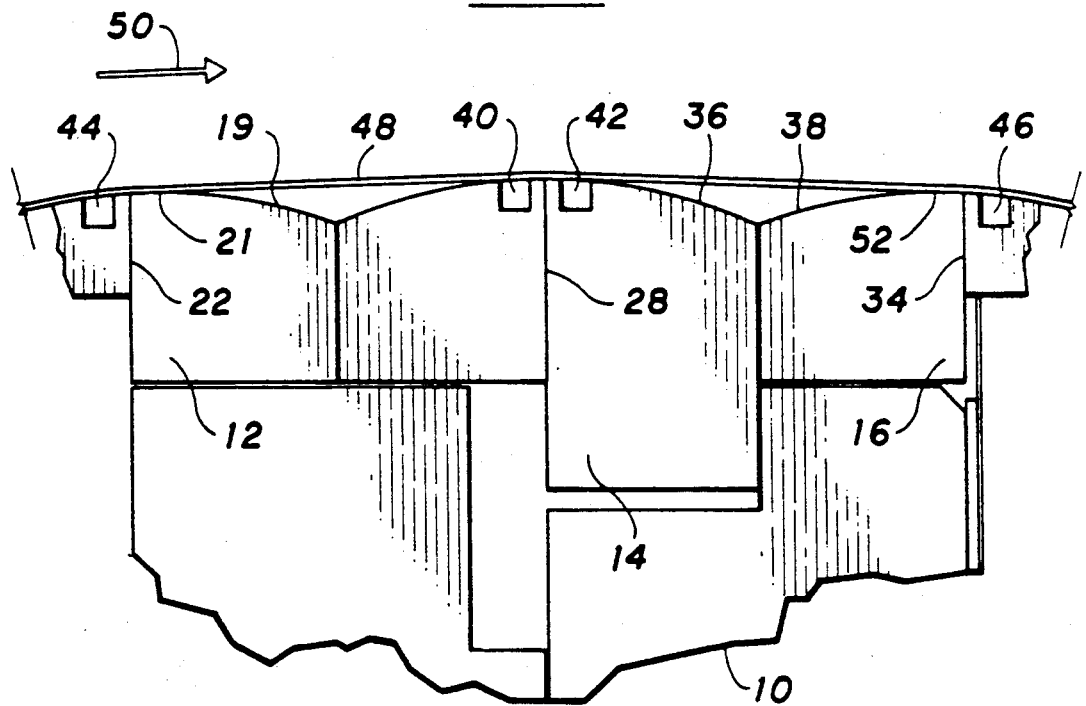
FIG. 2 is a partial profile view of the head assembly of FIG. 1 showing the tape pat relative to the head contours.

The read head 14 has two slots 40, 42 running the width of the head 14, on either side of the gap line 28. The write head 12 has one similar slot 44 outboard of its write gap line 22, and the write head 16 has one similar slot 46 outboard of its write gap line 34. Referring to FIG. 2, a tape 48 moving in the direction of the arrow 50 first contacts the write head 12 traversing the slot 44 before contacting the gap line 22. The gap line of the write head 12 is off the apex 21 of the contour 19, and the tape wraps the contour 19, contacting the contour 19 and engaging the slot 44 and the gap line 22. For tape motion in the direction 50 as shown, the write head 12 is the active write head, and intimate contact at the gap line 22 where data is written is assured by the skiving action of the slot 44. Upon leaving the write head 12, the tape 48 next encounters the read head 14 where the just previously recorded data is to be read while the writing of new data continues at the write head 12. It will be appreciated that air again becomes adherent to the tape as it travels from the write head 12 to the read head 14. For the assumed direction of tape travel, the slot 40 at the read head 14 skives the air film and any adherent debris from the tape before the tape intimately engages the transducing elements located at the gap line 28 of the read head 14. Upon leaving the read head 14, and as the tape proceeds to engage the non-active (for the assumed direction of tape motion 50) write head 16, it approaches the contour 38 after its apex 52 and contacts the contour over a gently arced portion of the contour 38. Hence, any air adherent to the tape 48 is compressed between the tape 48 and the smooth portion of the contour 38 and the tape is caused to "lift off" from the contour 38 and to fly, minimizing the abrasive action between the tape 48 and the inactive write head assembly 16.

It will be appreciated that for tape motion in the direction opposite to the arrow 50, the roles of the write heads 12,16 are interchanged, with the tape 48 engaging the now active write gap 34, and the tape flying over the downstream inactive write head 12. For this condition, at the read head 14 the slot 42 rather than the slot 40 skives the tape before it reaches the read gap 28.

Figure 3:
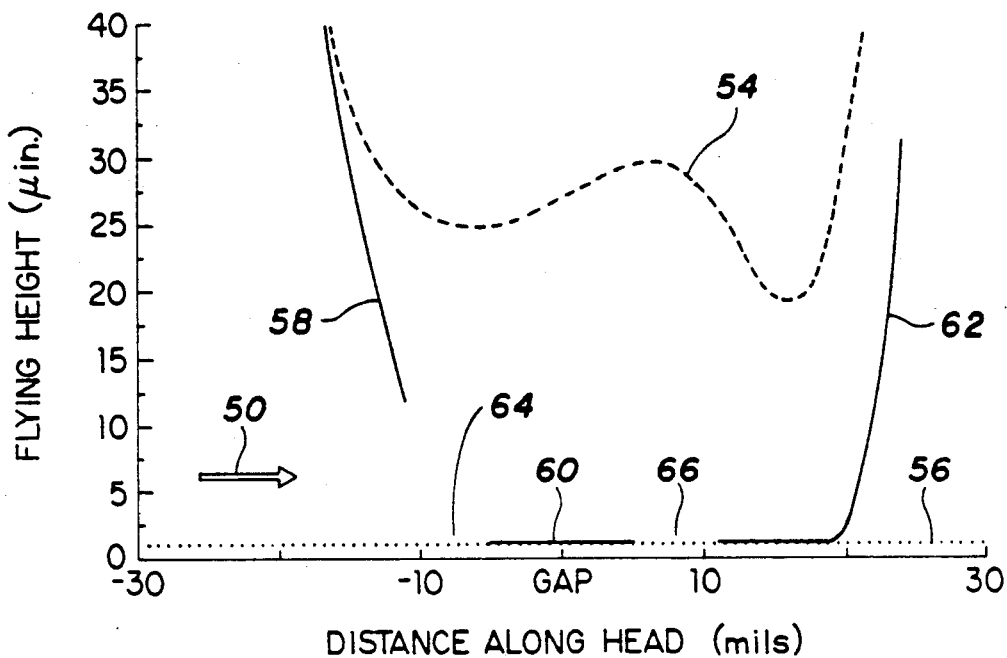
FIG. 3 are curves showing the effect of the slots on a read head of the head assembly according to the invention.

The effect of the slots 40,42,44,46 on tape-head contact may be further understood by reference to FIG. 3. These curves pertain to a tape of thickness 0.0005" and Young's modulus of $1 \times 10/6$ psi, travelling over the head assembly 10 at a speed of 62.5 inches per second, with a tension of 2 oz, and where the wrap angle at each head 12,14,16 is 5.36 degrees. The slots 40,42,44,46 are 0.006" wide and 0.005" deep. With the tape moving in the direction 50, the case of a read head having the contour of the head 14 but without the slots 40,42, is first assumed. Under this assumption, the curve 54 shows the flying of the tape over the entire contour of the assumed non-slotted head. That is, without slots, and attendantly no skiving of the adherent air from the tape, the tape would fly at a height of from 20–25 microinches above the surface contour of the head. For the head 14, however, with the slots 40,42, the curve consisting of the segments 58,60,62 shows the flying height of the tape over the surface finish 56; the flying height is not defined at the breaks in the curve, i.e. broken positions 64,66, corresponding to the tape traversing the slots 40,42. As the tape approaches the head 14, the segment 58 shows the decreasing flying height during the approach to the surface finish 56. Flying over the slot 40, i.e. broken position 64, the air is skived from the tape, and as it crosses the gap region, the tape is down against the surface finish, i.e. segment 60. Upon leaving the gap region 60, the tape traverses the slot 44, i.e. broken position 66, and remains in contact with the head contour until it breaks away at about 20 mils after crossing the gap, i.e. segment 62.

Figure 4:
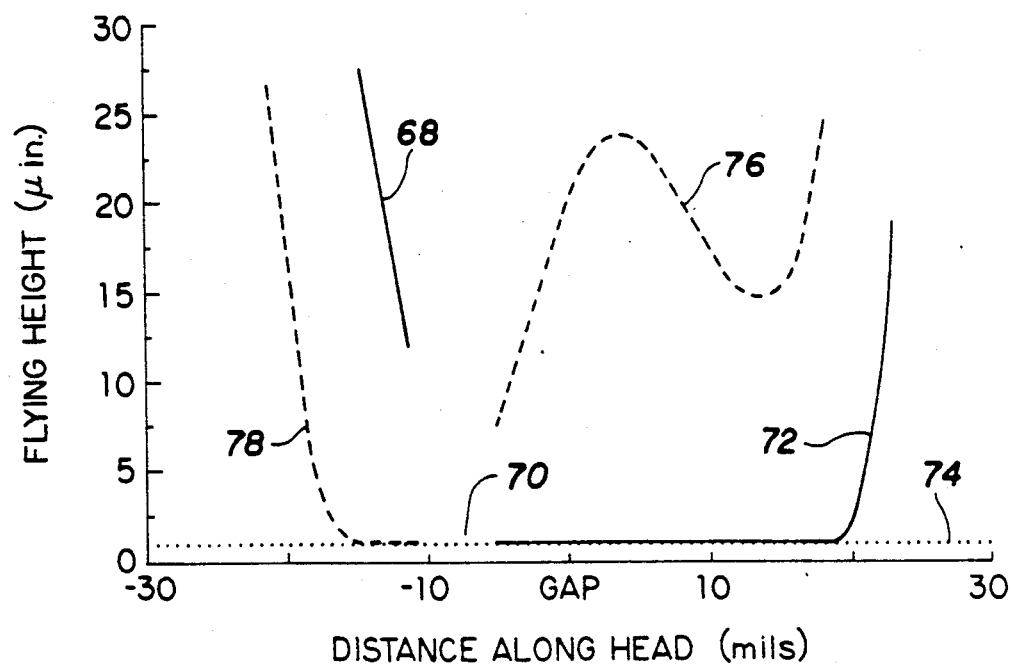
FIG. 4 are curves showing the effect of the slot on a write head of the head assembly according to the invention.

Referring to FIG. 4, the condition existing with regard to tape flying height is illustrated for the writing head 12 or 16.

First, assuming the tape is travelling in the direction from left to right in FIG. 4, that is, the condition where the head 12 will be the active writing head and good contact at the write gap 22 is required. The segment 68 shows the tape height decreasing as it approaches the slot region 44 corresponding to the break position 70. Because the slot 44 skives the air from the tape, upon leaving the slot 44, i.e. the break position 70, the tape is in intimate contact with the surface finish 74 over the horizontal portion of the segment 72. About 20 mils after passing the gap, the tape starts breaking away from the head, i.e. the vertical portion of the segment 72. Note that the tape is in intimate contact with the gap under these conditions, and also that the exact location of the gap is relatively insensitive to placement along the head contour after the slot 44. On the other hand, for the opposite tape movement in the direction from right to left in FIG. 4, that is, when the head 12 is the inactive writing head, minimal contact with the head contour is desired. The tape approaches the gap from the non-slotted side of the write head, and the tape flies over the gap section as shown by the segment 76. After the tape flies over the gap region, it engages the slot 44 and because the air is then skived from the tape, the tape contacts the contour surface finish 74 for the short distance (about 0.005") represented by the horizontal portion of the segment 78, before the tape breaks away from the surface 74. It will be appreciated that the tape substantially flies over the contour for this direction of travel, and does not at all contact the contour in the critical gap region. Corresponding conditions exist at the head 16 for the opposite direction of tape travel.

The invention has been described in detail with particular reference to preferred embodiments thereof, but it will be understood that variations and modifications can be effected within the spirit and scope of the invention.

What is claimed is:

1. In bi-directional magnetic tape recording/playback apparatus comprising a magnetic head assembly including a playback head disposed between a first record head and a second record head, and means for transporting a magnetic tape past said magnetic head assembly (1) in a first direction wherein said playback head plays back information recorded by said first record head, and (2) in a second direction wherein said playback head plays back information recorded by said second record head, the improvement comprising:
   a) said first record head and said second record head including, respectively, a magnetic transducing gap situated in a gently curved tape-engaging surface the effect of which is to cause tape-entrained air to decouple advancing tape from said curved surface and to thereby "flyover" the corresponding magnetic transducing gap;
   b) said first record head further including an elongated air-skiving slot disposed in said gently curved tape-engaging surface transverse to advancing tape at a location wherein tape advancing in the first direction passes over the air-skiving slot prior to moving past the corresponding magnetic transducing gap, the effect of the air-skiving slot being to remove air entrained on advancing tape and the effect of its location being to cause tape advancing in the first direction to be in operative contact with the magnetic transducing gap of said first record head whereas tape advancing in the second direction continues to "flyover" the transducer gap of said first record head, thereby, respectively, enhancing signal-to-noise ratio of said first record head when tape is transported in the first direction and eliminating wear at the interface between tape and the transducing gap of said first record head when tape is transported in the second direction;
   c) said second record head further including an elongated air-skiving slot disposed in said gently curved tape-engaging surface transverse to advancing tape at a location wherein tape advancing in the second direction passes over the air-skiving slot prior to moving past the corresponding magnetic transducing gap, the effect of the air-skiving slot being to remove air entrained on advancing tape and the effect of the location of the air-skiving slot being to cause tape advancing in the second direction to be in operative contact with the magnetic transducing gap of said second record head whereas tape advancing in the first direction continues to "fly over" the transducer gap of said second record head, thereby, respectively, enhancing the signal-to-noise ratio of said second record head when tape is advanced in the second direction and eliminating wear at the interface between tape and the transducing gap of said second record head when tape is transported in the first direction.

2. In bi-directional magnetic tape recording/playback apparatus comprising a magnetic head assembly including a playback head disposed between a first record head and a second record head, and means for transporting a magnetic tape past said magnetic head assembly (1) in a first direction wherein said playback head plays back information recorded by said first record head, and (2) in a second direction wherein said playback head plays back information recorded by said second record head, the improvement comprising:
   a) each of said magnetic heads including a magnetic transducing gap situated in a gently curved tape-engaging surface the effect of which is to cause tape-entrained air to decouple advancing tape from said curved surface and to thereby "fly over" the corresponding magnetic transducing gap;
   b) said first record head further including an elongated air-skiving slot disposed in said gently curved tape-engaging surface transverse to advancing tape at a location wherein tape advancing in the first direction passes over the air-skiving slot prior to moving past the corresponding magnetic transducing gap, the effect of the air-skiving slot being to remove air entrained on advancing tape and the effect of its location being to cause tape advancing in the first direction to be in operative contact with the magnetic transducing gap, to thereby enhance signal-to-noise ratio, whereas tape advancing in the second direction continues to "fly over" the transducer gap, to thereby eliminate wear at the interface between tape an the transducing gap of said first record head when tape is transported in the second direction;
   c) said second record head further including an elongated air-skiving slot disposed in said gently curved tape-engaging surface transverse to advancing tape at a location wherein ape advancing in the first direction passes over the air-skiving slot prior to moving past the corresponding magnetic transducing gap, the effect of the air-skiving slot and its location being to remove air entrained on advancing tape and the effect of its location being to cause tape advancing in the second direction to be in operative contact with the magnetic transducing gap, to thereby enhance signal-to-noise ratio, whereas tape advancing in the first direction continues to "fly over" the transducer gap, to thereby eliminate wear at the interface between tape and the transducing gap of said second record head when tape is transported in the first direction;
   d) said playback head further including a pair of elongated air-skiving slots disposed in said gently curved tape-engaging surface transverse to advancing tape at respective locations on opposing sides of the magnetic transducing gap, the effect of the air-skiving slots being to remove air entrained on advancing tape to cause tape advancing in either direction to be in operative contact with the magnetic transducing gap of said playback head.

3. In bi-directional magnetic tape recording/playback apparatus comprising a magnetic head assembly including a magnetic head of a first type disposed between first and second magnetic heads of a second type, and means for transporting a magnetic tape past said magnetic head assembly (1) in a first direction wherein said magnetic head of the first type and said first magnetic head of the second type are arranged wherein one head plays back information immediately after it is recorded by said other head, and (2) in a second direction wherein said magnetic head of the first type and said second magnetic head of the second type are arranged wherein one head plays back information immediately after it is recorded by said other head, the improvement comprising:

a) each of said first and said second magnetic heads of the second type including a magnetic transducing gap situated, respectively, in a gently curved tape-engaging surface the effect of which is to cause tape-entrained air to decouple advancing tape from each of said curved surfaces and to thereby "fly over" the corresponding magnetic transducing gap;

b) said first magnetic head of the second type further including an elongated air-skiving slot disposed in its gently curved tape-engaging surface transverse to advancing tape at a location wherein tape advancing in the first direction passes over the air-skiving slot prior to moving past the corresponding magnetic transducing gap, the effect of the air-skiving slot being to remove air entrained on advancing tape and the effect of its location being to cause tape advancing in the first direction to be in operative contact with the magnetic transducing gap of said first magnetic head of the second type whereas tape advancing in the second direction continues to "fly over" the transducer gap of said first magnetic head of the second type, thereby, respectively, enhancing signal-to-noise ratio of said first magnetic head of the second type when tape is transported in the first direction and eliminating wear at the interface between tape and the transducing gap of said first magnetic head of the second type when tape is transported in the second direction;

c) said second magnetic head of the second type further including an elongated air-skiving slot disposed in its gently curved tape-engaging surface transverse to advancing tape at a location wherein tape advancing in the second direction passes over the air-skiving slot prior to moving past the corresponding magnetic transducing gap, the effect of the air-skiving slot being to remove air entrained on advancing tape and the effect of the location of the air-skiving slot being to cause tape advancing in the second direction to be in operative contact with the magnetic transducing gap of said second magnetic head of the second type whereas tape advancing in the first direction continues to "fly over" the transducer gap of said second magnetic head of the second type, thereby, respectively, enhancing the signal-to-noise ratio of said second magnetic head of the second type when tape is advanced in the second direction and eliminating wear at the interface between tape and the transducing gap of said second magnetic head of the second type when tape is transported in the first direction.

* * * * *

UNITED STATES PATENT AND TRADEMARK OFFICE
CERTIFICATE OF CORRECTION

PATENT NO. : 5,034,838

DATED : July 23, 1991

INVENTOR(S) : G. Brock, W. Czarnecki and J. Connolly

It is certified that error appears in the above-identified patent and that said Letters Patent is hereby corrected as shown below:

Col. 6, line 26       "an" should be ---and---

Col. 6, line 32       "ape" should be ---tape---

Col. 6, line 33       "first" should be ---second---

Signed and Sealed this

Twelfth Day of January, 1993

Attest:

DOUGLAS B. COMER

*Attesting Officer*          *Acting Commissioner of Patents and Trademarks*